(12) United States Patent
Gazenko

(10) Patent No.: US 10,327,451 B2
(45) Date of Patent: Jun. 25, 2019

(54) PERSONAL PORTABLE DEVICE FOR FERMENTATION

(71) Applicant: Sergey Gazenko, Cincinnati, OH (US)

(72) Inventor: Sergey Gazenko, Cincinnati, OH (US)

( * ) Notice: Subject to any disclaimer, the term of this patent is extended or adjusted under 35 U.S.C. 154(b) by 0 days.

(21) Appl. No.: 14/515,026

(22) Filed: Oct. 15, 2014

(65) Prior Publication Data

US 2016/0106117 A1  Apr. 21, 2016

(51) Int. Cl.
  *C12M 1/00* (2006.01)
  *C12M 3/00* (2006.01)
  *A23C 9/12* (2006.01)
(52) U.S. Cl.
  CPC .................... *A23C 9/122* (2013.01)
(58) Field of Classification Search
  CPC ...... C12M 29/02; C12M 23/34; C12M 23/08; C12M 25/04; C12M 21/16
  See application file for complete search history.

(56) References Cited

U.S. PATENT DOCUMENTS

| 3,099,565 | A | * | 7/1963 | Neuhauser | A47G 21/183 215/388 |
| 4,733,785 | A | * | 3/1988 | Turner, Jr. | B65D 77/283 215/229 |
| 6,955,305 | B2 | * | 10/2005 | Banach | A47G 21/18 215/229 |
| 7,958,816 | B2 | * | 6/2011 | Lin | A47J 31/02 99/323 |
| 8,467,670 | B2 | * | 6/2013 | Baston | A47J 31/106 392/444 |
| 2012/0000923 | A1 | * | 1/2012 | Powell | B65D 43/0212 220/780 |
| 2012/0279939 | A1 | * | 11/2012 | Lee | B65D 51/28 215/227 |
| 2012/0301579 | A1 | * | 11/2012 | Lee | A47G 21/183 426/85 |
| 2012/0325835 | A1 | * | 12/2012 | Merino | A47G 19/2211 220/705 |
| 2014/0044837 | A1 | * | 2/2014 | Weisman | A47G 19/16 426/79 |
| 2015/0272147 | A1 | * | 10/2015 | Ericson | A23B 7/10 220/573.1 |
| 2015/0307265 | A1 | * | 10/2015 | Winn | A23L 2/395 426/66 |

* cited by examiner

*Primary Examiner* — Nathan A Bowers
(74) *Attorney, Agent, or Firm* — Wood Herron & Evans LLP

(57) ABSTRACT

Portable reusable fermenter for easy preparation of homemade kefir with use of kefir grains restrained in the plastic chamber submerged in the milk. Chamber has large number of halls for easy access of milk to kefir grains. The size of halls is significantly smaller that the size of kefir grains in order to keep grains inside chamber but big enough for free access to milk. Portable fermenter with the same set of grains is reusable. Drinking of kefir can be done through plastic straw without of separation of grains and ready kefir.

12 Claims, 4 Drawing Sheets

PERSONAL PORTABLE DEVICE FOR FERMENTATION

FIELD OF THE INVENTION

The present invention relates to portable devices for simple fermentation of milk into kefir by live kefir grains for personal consumption.

BACKGROUND OF THE INVENTION

Kefir is a product of fermentation of milk by kefir grains. Kefir grain is an agglomerate of various microorganisms of lactic acid bacteria, acetic acid bacteria and yeasts in a polysaccharide/protein matrix, which produces by some species of grain. Matrix protects grain (microbiota) from dissolution and invading of other species. The structure and composition of kefir grain is favorable for symbiotic relations of these different species.

Kefir is manufactured by industry in big amounts and sold on a large distance from the manufacturing site. Time between commercial manufacturing and consumption can be 2-3 months if stored at low temperatures and contains artificial substances like pectin. During the period of storage and transportation acidity of product increases and number of live probiotic cells significantly decreases. Storage and transportation always needs low temperature to prevent deterioration of product. Artificial additives like pectin are added to commercial kefir. These disadvantages of big commercial manufacturing decrease quality of kefir. Decreased quality of commercial kefir creates a need to produce fresh natural kefir at home.

Currently used process of homemade producing of kefir contains several time-consuming steps: adding milk to kefir grains, incubating around 24+/−4 hours at room temperature, separating grains from fresh kefir by plastic strainer and wooden spatula, collecting of ready kefir in separate jar, washing kefir grains in order to use them again in new cycle and cleaning all used utensils and working space. The process of separation through strainer significantly damages relatively soft kefir grains. Thus currently used method of homemade kefir production is not really simple, need training and experience and relatively time-consuming.

SUMMARY OF THE INVENTION

Current invention significantly simplifies process of milk fermentation. It doesn't need separation of grains and kefir and doesn't hurt or damage grains. It doesn't need any additional instruments except device itself. Fermentation of milk and consumption of kefir is provided by the same jar. The device allows process to be clean, simple and time saving. Also, the process can be repeated endless number of times with the same kefir grains.

Personal portable device for fermentation of milk into kefir consists of several parts connected in one device is describes. Invented device contains of the following main parts: container having an upper opening, lid removable attachable to the upper opening of the container, chamber insertable in the container having a multiplicity of ports and being adapted to house at least one kefir grain agglomerate and elongated tube adapted to project through the lid and the chamber.

Device allows cutting several regular steps, simplified process and allowing consuming fresh product directly from fermenter. Portable personal fermenter contains chamber with many ports, which is used for storage of kefir grains. It allows grains to be separated from milk during consumption but allows free access of milk to grains during fermentation.

Regular method contains steps: place grains in glass bottle/jar; reliably cover bottle with air permeable material; incubate 20-24 or more hours; separate ready kefir and grains by filtering through strainer with the help of wooden spatula in storage bottle; replace separated kefir grains in another bottle and add milk to start next fermentation (this stage may need washing of grains in water); replace kefir from storage jar to cap and consume.

Invented method and device contains steps: add milk to portable fermenter; incubate 12-24 hours; consume ready kefir directly from jar; new portion of milk added to substitute consumed volume of product. Thus invented device allows simplify process of fermentation, consumption and saves time.

DETAILED DESCRIPTION OF A REPRESENTATIVE EMBODIMENT

Kefir is a useful product with special probiotics qualities and set of different vitamins and nutrients. It is manufactured in different countries in big amounts. Industrial manufacturing needs special qualities of product especially with respect to prolonged storage and ability for transportation over large distances. Thus, kefir manufactured in industrial amounts contains pectin for maintaining consistency of product during long storage and transportation, which changes taste and prevent viability of microorganisms. Finally, industrial kefir very often becomes too acidic, doesn't have natural delicious taste and has many times smaller amount of live microorganisms, which lower the probiotic activity. These drawbacks create a need for many people to produce fresh homemade kefir from kefir grains.

Figure 2:
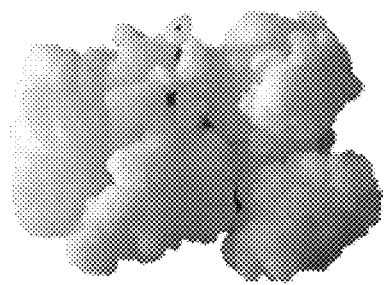
FIG. 2. is an elevational view of a kefir grain or agglomerate.

Kefir grain is a typical Zoogloea—symbiotic composition of different bacteria and yeast. The number of species in Zoogloea can be several tens. Large number of different species significantly increases probiotic qualities. The cells are connected together in agglomerate by polysaccharide transmissible to water and nutrients. Kefir grains are resilient structure withstanding moderate pressure (FIG. 2). They look like white or yellowish biomass.

Kefir grains have ability to grow/increase biomass when placed in milk and ferment it in kefir.

Traditional technology of homemade kefir is cumbersome as was described.

Figure 1:
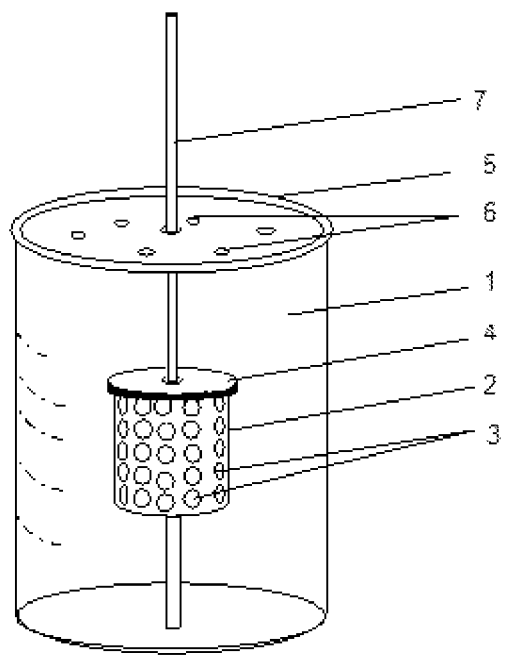
FIG. 1. is an elevational view of the present device for fermenting of milk.

Use of invented device makes process of fermenting of milk and consuming of homemade kefir simple, fast and harmless to kefir grains. The general view of portable fermenter is demonstrated on FIG. 1.

The device contains glass jar (1) for milk fermentation. Chamber (2) used as a carrier and enclose for kefir grains. It has many holes (3) from all sides for easy access of milk to kefir grains. Chamber (2) may have halls on the walls, on a lid (4) and on a bottom (not shown). Chamber (2) attached to a plastic straw (7).

Kefir grains (FIG. 2) are soft but resilient biomass. They create relatively big agglomerate, which need to be larger than holes (3) in order to reliably stay inside chamber (2) during pouring of fresh milk, fermenting and drinking of ready kefir. Jar (1) is covered by lid (5) having several small holes (6). These holes serves for access of atmospheric Oxygen needed to participate in transformation of milk in kefir due to aerobic nature of fermentation. Small size of holes is required to protect reaction space from possible invasion of insects. Chamber (2) is attached to strong plastic straw (7) used as carrier for chamber (2) and for drinking of ready kefir from the jar (1) without of opening a lid, filtrating/separating, collecting in another jar and without other operations that are used in traditional home preparation.

Figure 3:
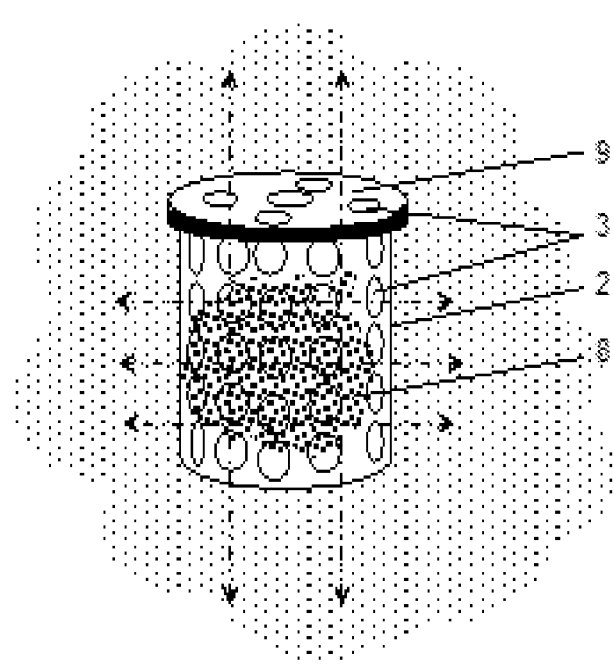
FIG. 3. is an elevational view of a kefir grain housed within a chamber in the present fermenter.

The body of kefir grains (8, FIG. 3) (usually it is one big agglomerate) placed in a chamber (2) through opening covered by removable lid (9). This operation needs to be done only once: kefir grains can be used for many weeks or months. Lid (9) could have relatively big holes (but smaller than grains) for better access of milk. Numerous holes (3) in the lid, walls and bottom (not shown) allow free access of milk (shown by arrows) to kefir grains. The process of fermentation takes place throughout the entire volume of milk (clouds around chamber on FIG. 3) because cells from the surface of kefir grains transfer through holes in the space of fermenter. Thus, chamber (8) doesn't restrict fermentation. The functions of chamber are to separate ready kefir from kefir grains, prevent consumption of grains by user, protect kefir grains from mechanical damages and support easy manipulations during grow. The chamber attached to plastic straw that has relatively thick (around 1.0 mm) plastic wall in order to carry chamber reliably. The time of fermentation can be 20-28 hours at room temperature or 10-14 hours at 28-32° C. Longer fermentation increases acidity of final product.

The preferable material for jar is glass. Preferable material for chamber and straw is plastic (polyethylene, polyurethane, nitrocellulose and other). Use of metal parts is not recommended due to adverse influence on health of kefir grains.

The sizes of jar, chamber, straw and holes can vary depending on volume of fermenter. Amount of kefir grains must be around 2 grams for 100 ml of milk.

Larger amount of grains can shorten time of fermentation.

Figure 4:
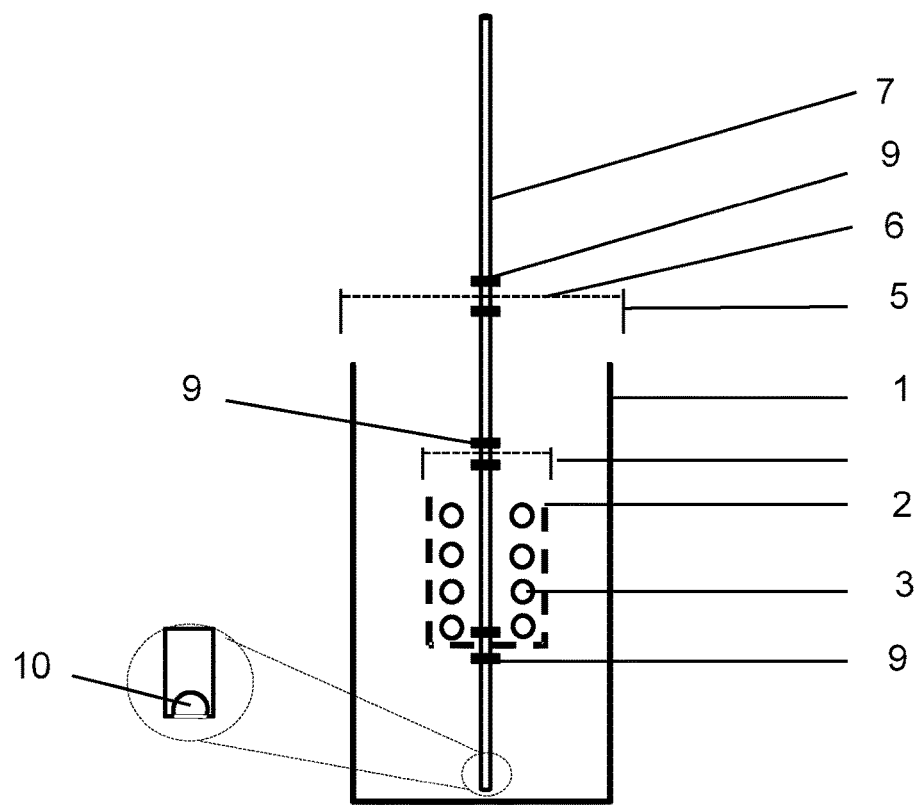
FIG. 4. Is a diagrammatic view of the various components of the present fermenter.

Detailed structure/design of portable fermenter for production of kefir is shown on FIG. 4. According this design straw (7) goes through lid of jar (5) having small holes (0.1-1.0 mm, number can be from 2-4 to 4-12 or more) (6), through lid of chamber (4) having relatively large holes, bottom of the chamber (4) and rests in the bottom of glass jar (1). Straw (7) clamped by plastic or rubber washers (9) to lid of glass jar (5), to lid of chamber (4) and to bottom of chamber (2). Threads also can be used as alternative for washers to keep parts together. Lid of glass jar (5) is attached to glass jar (1). Thus, combination of straw (7), lid (5), lid (4) and chamber (2) is a single attachment piece. Nevertheless it can be disassembled because washers (9) are removable. Ability to be disassembled is important for cleaning of device and changing kefir grains.

Kefir produced inside of portable fermenter can be consumed without opening of portable fermenter, just through straw (7), which rested on the bottom of glass jar (1). This position of straw (7) can block lower opening of straw during drinking. To prevent these, two or more notches (10) are made on the lower end of straw for easy access of kefir through straw.

It is clear that device invented for retaining of kefir grains can be used for other purposes. For example for flavoring cold liquids by adding slowly dissolved or slowly releasing flavorful natural components (like mint leaves, orange skin and other) or aromatic substances in solid forms where solid parts are larger than holes (3) of the chamber (2).

EXAMPLE

Portable fermenter having kefir grains filled with fresh milk and incubated at room temperature 20-24 hours. After incubation kefir is consumed through upper part of plastic straw.

The invention claimed is:

1. A portable device for fermenting milk into kefir from at least one kefir grain agglomerate, the device comprising:
   a container having an upper opening, the container defining a reaction space therein for containing milk;
   a lid removably attachable to the upper opening of the container to enclose the reaction space, the lid including a plurality of holes for the passage of air into and out of the reaction space;
   a separate chamber defining an internal space configured for containing at least one kefir grain agglomerate, the chamber dimensioned for being wholly insertable into the reaction space of the container;
   the separate chamber including a plurality of ports formed therein for providing the flow of milk in the reaction space into and out of the chamber internal space to contact the at least one kefir grain agglomerate therein for fermentation to form kefir; and
   an elongated tube adapted to project through an opening in the lid and into the reaction space of the container, the tube configured for allowing the drinking of kefir fermented from milk from the reaction space of the container;
   the elongated tube engaging the separate chamber and passing therethrough isolated from the internal space for supporting and suspending the chamber in the reaction space of the container for fermentation while allowing drinking of kefir from outside of the chamber internal space.

2. The portable fermenting device according to claim 1, wherein holes for the passage of air are sufficiently small to prevent dust and insects from entering the reaction space of the container.

3. The portable fermenting device according to claim 1, wherein the chamber is provided with a top and bottom, said top being removably mounted on the chamber, each of the top and the bottom having a tube-receiving opening, the elongated tube engaging and gassing through the chamber through the tube-receiving openings.

4. The portable fermenting device according to claim 3, further comprising a washer on the elongated tube, the washer engaging the chamber proximate at least one tube-receiving opening of the chamber.

5. The portable fermenting device according to claim 4, wherein the elongated tube is substantially rigid.

6. The portable fermenting device according to claim 4, wherein the washer is movable on the elongated tube to change the position of the engagement with the chamber.

7. The portable fermenting device according to claim 1, wherein the container is made of glass or food grade polymer.

8. The portable fermenting device according to claim 1, wherein the chamber is made of food grade polymer.

9. The portable fermenting device according to claim 1, wherein the ports in the chamber are smaller than the kefir grain agglomerate.

10. The portable fermenting device according to claim 1, wherein the elongated tube is formed from food grade polymer or stainless steel.

11. The portable fermenting device according to claim 1, wherein the container is formed with a lower wall opposite the lid and wherein a lower end of the elongated tube is adapted to rest on the lower wall of the container.

12. The portable fermenting device according to claim 11, wherein a notch is formed in the elongated tube adjacent to a lower end thereof.

* * * * *

UNITED STATES PATENT AND TRADEMARK OFFICE
CERTIFICATE OF CORRECTION

PATENT NO. : 10,327,451 B2
APPLICATION NO. : 14/515026
DATED : June 25, 2019
INVENTOR(S) : Sergey Gazenko It is certified that error appears in the above-identified patent and that said Letters Patent is hereby corrected as shown below:

In the Claims

Column 4, Line 52, Claim 3, reads "...elongated tube engaging and gassing through the chamber..." and should read -- ...elongated tube engaging and passing through the chamber... --

Signed and Sealed this
First Day of October, 2019

Andrei Iancu
*Director of the United States Patent and Trademark Office*